Patented Mar. 15, 1932

1,849,537

UNITED STATES PATENT OFFICE

JOSEPH N. BORGLIN, OF KENVIL, NEW JERSEY, ASSIGNOR TO HERCULES POWDER COMPANY, OF WILMINGTON, DELAWARE, A CORPORATION OF DELAWARE

METHOD OF PURIFYING ROSIN

No Drawing.    Application filed December 14, 1929.   Serial No. 414,227.

My invention relates to a method purifying rosin, more particularly wood rosin and the lower grades of gum rosin.

As is well known wood rosin, such as is obtained from pine wood, and the lower grades of gum rosin, do not lend themselves to use in the production of soaps, sizing for the highest grade papers, high grade varnishes, etc., since they, and especially wood rosin, contain inert color bodies which on exposure to oxygen, as in the air, and more especially to air and an alkali, as in soaps, tend to darken and undesirably darken the color of the product in which they are incorporated. In the case, for example, of soaps made with wood rosin, or low grade gum rosin, the soap is ordinarily of a dark color when produced and discolors badly on aging.

Wood rosin, as is well known, is principally produced by extracting pine wood, from which turpentine has been removed by steam distillation, with a solvent for the rosin, as gasoline, the rosin being recovered by distilling off the solvent. Wood rosin as heretofore produced has been purified to an extent. However, wood rosin and low grade gum rosin cannot be purified by ordinary methods, as distillation, to an extent permitting their use in connection with soaps, high grade paper size, etc.

Now in accordance with my invention I provide a process for the treatment of wood rosin and low grade gum rosin by which such will be purified to an extent enabling their use in soaps, etc., without causing discoloration on aging.

The process embodying my invention involves broadly the distillation of wood rosin or low grade gum rosin in the presence of a boron compound, such, for example, as common borax, boric acid, boric anhydride and the like. My invention also contemplates the treatment, as by washing, of a solution of wood rosin or low grade gum rosin in a solvent, as gasoline, or other light hydrocarbon distillate, or a workable equivalent therefor, with a boron compound, as, for example, borax in solution to remove from the gasoline-rosin solution a portion of the rosin and then distilling rosin recovered from the gasoline-rosin solution in the presence of a boron compound, for example, boric acid. The washing of the rosin solution with a boron compound in solution acts to effect separation of a portion of the color bodies, including inert or latent color bodies, from the rosin.

The treatment of wood rosin and low grade gum rosin in accordance with my invention will produce a rosin which is of light color and which will retain its light color on aging and will not cause soaps and the like to darken or discolor on aging.

In accordance with my invention I may effect distillation of the rosin in the presence of preferably from about 0.3% to about 1.0% of a boron compound and the distillation is preferably effected at a temperature of from about 250° C. to about 290° C., under a pressure of from about 1 to about 2 centimeters of mercury. When in the carrying out of my invention a rosin solution, as a solution of rosin in a solvent, as gasoline, other light hydrocarbon distillate, or workable equivalent, is used, the rosin solution is washed with a boron solution, preferably a borax solution, to remove preferably above 8% of the rosin from the solution. The remaining rosin is separated from the solvent, as by the distillation off of the solvent, and then distilled in the presence of a boron compound, preferably boric acid.

As a typical example of the process embodying my invention, one part of powdered boric acid ($H_3BO_3$) is mixed with 100 parts of wood rosin grading FF in color and the rosin distilled, in any suitable apparatus, at a temperature between about 250° C. and about 290° C. under a pressure of about 1 to 2 centimeters of mercury. About 70 parts of rosin grading N in color are obtained.

Under similar conditions the distillation of wood rosin with about 0.3% of boric anhydride ($B_2O_3$) will give substantially the same result. Ordinary borax ($Na_2B_4O_7.10H_2O$) may be used in place of boric acid or boric anhydride, but due to the presence of a large amount of water of crystallization, the heating should be gradual at first in order to avoid foaming, therefore anhydrous borax is preferred.

With the use of 1 part of hydrated borax to 100 parts of wood rosin distillation as with the use of boric acid yielded 72 parts of distilled rosin having an acid number of 168 and a soap produced therefrom was found to be greatly improved over the soap obtained from ordinary distilled rosin.

Proceeding with the use of a boron compound as above described, the rosin treated will be refined by the removal of color bodies and, more particularly, of inert or latent color bodies such as those which tend to darken in the presence of air and an alkali and which render the rosin containing such color bodies unusable for the production of soaps, sizes, etc. where light color is desired or essential, since such color bodies, as has been indicated, cause discoloration or darkening of soaps, sizes, etc. on aging.

The treatment of the rosin as described in the presence of a boron compound enables refining or separation of color bodies, more particularly, inert or latent color bodies, from the rosin. In the treatment the distillate involves the refined rosin, the inert or latent color bodies remaining in the residue.

In the method in accordance with my invention the boron compound, when used for preliminarily washing the rosin and in connection with distillation of the rosin, acts to remove color bodies and more particularly latent color bodies from rosin, acting, in the case of washing, as a solvent for the color bodies and in a minor degree for the rosin. In washing with boron compound in solution a certain amount of rosin and latent color bodies is dissolved and may be separated from the rosin solution and in the case of distillation in the presence of the boron compound, it serves to retain the color bodies in the residue.

As has been indicated, a solution of wood rosin in a solvent therefor, as gasoline, or other light hydrocarbon distillate or workable equivalent therefor, may be washed with a borax solution sufficient to remove about 8% of the rosin. The remaining rosin is then recovered from the solution with its solvent, as gasoline, and distilled with the addition of say about 0.5% boric acid. Such treatment will give a rosin which will produce a soap which will not discolor on aging.

Having now fully described my invention, what I claim and desire to protect by Letters Patent is:

1. The method of purifying rosin, which includes distilling rosin in the presence of boric acid and collecting the distillate.

2. The method of purifying rosin, which includes admixing boric acid with rosin, distilling the rosin and collecting the distillate.

3. The method of purifying rosin, which includes admixing rosin with about 0.3% of boric acid distilling the rosin and collecting the distillate.

4. The method of purifying rosin, which includes admixing rosin with about 0.3% of boric acid distilling the rosin at a temperature of from about 250° C. to about 290° C. and collecting the distillate.

5. The method of purifying rosin, which includes admixing rosin with about 0.3% of boric acid distilling the rosin under a pressure of from about 1 to about 2 centimeters of mercury and at a temperature of about 250° C to about 290° C. and collecting the distillate.

6. The method of purifying rosin which includes distilling rosin in the presence of a compound of boric acid and collecting the distillate.

7. The method of purifying rosin which includes admixing a compound of boric acid with rosin distilling the rosin and collecting the distillate.

8. The method of purifying rosin which includes admixing rosin with about 0.3% to about 1.0% of a compound of boric acid and distilling the rosin.

9. The method of purifying rosin which includes admixing a compound of boric acid with rosin distilling the rosin at a temperature of about 250° C. to 290° C. and collecting the distillate.

10. The method of purifying rosin which includes distilling the rosin in the presence of a boron compound and collecting the distillate.

11. The method of purifying rosin which includes admixing a boron compound with distilling the rosin and collecting the distillate.

12. The method of purifying rosin which includes distilling rosin in the presence of boron compound under a pressure less than 76 centimeters mercury, and collecting the distillate.

13. The method of purifying rosin which includes distilling rosin in the presence of boric acid under a pressure less than 76 centimeters mercury and collecting the distillate.

14. The method of purifying rosin which includes admixing rosin with about 0.3% of boric acid, distilling the rosin under a pressure less than 76 centimeters mercury and collecting the distillate.

15. The method of purifying rosin which includes admixing rosin with about 0.3–1.0% of a compound of boric acid, distilling the rosin under a pressure less than 76 centimeters mercury and collecting the distillate.

16. The method of purifying rosin which includes mixing rosin with about 0.3–1.0% of boron compound, distilling the rosin under a pressure less than 76 centimeters mercury and collecting the distillate.

17. The method of purifying rosin which includes distilling rosin in the presence of boron compound under a pressure less than 76 centimeters mercury and at a temperature of about 250-290° C. and collecting the distillate.

18. The method of purifying rosin which includes a distilling rosin in the presence of a boron compound under a pressure of about 2 centimeters mercury and collecting the distillate.

19. The method of purifying rosin which includes distilling rosin in the presence of boric acid under a pressure of about 2 centimeters mercury and collecting the distillate.

20. The method of purifying rosin which includes admixing rosin with about 0.3-1.0% of a boron compound, distilling the rosin under a pressure of about 2 centimeters mercury and collecting the distillate.

21. The method of purifying rosin which includes admixing rosin with about 0.3-1.0% of boric acid, distilling the rosin under a pressure of about 2 centimeters mercury and collecting the distillate.

22. The method of purifying rosin which includes distilling rosin in the presence of about 0.3-1.0% of a boron compound at a temperature of about 250-290° C. under pressure of about 1-2 centimeters of mercury.

In testimony of which invention, I have hereunto set my hand, at Kenvil, N. J., on this 12th day of December, 1929.

JOSEPH N. BORGLIN.

CERTIFICATE OF CORRECTION.

Patent No. 1,849,537.            Granted March 15, 1932, to

JOSEPH N. BORGLIN.

It is hereby certified that error appears in the printed specification of the above numbered patent requiring correction as follows: Page 2, line 102, claim 11, after the word "with" insert the word rosin and a comma; and that the said Letters Patent should be read with this correction therein that the same may conform to the record of the case in the Patent Office.

Signed and sealed this 3rd day of May, A. D. 1932.

(Seal)                                                                  M. J. Moore,
Acting Commissioner of Patents.

boron compound under a pressure less than 76 centimeters mercury and at a temperature of about 250-290° C. and collecting the distillate.

18. The method of purifying rosin which includes a distilling rosin in the presence of a boron compound under a pressure of about 2 centimeters mercury and collecting the distillate.

19. The method of purifying rosin which includes distilling rosin in the presence of boric acid under a pressure of about 2 centimeters mercury and collecting the distillate.

20. The method of purifying rosin which includes admixing rosin with about 0.3-1.0% of a boron compound, distilling the rosin under a pressure of about 2 centimeters mercury and collecting the distillate.

21. The method of purifying rosin which includes admixing rosin with about 0.3-1.0% of boric acid, distilling the rosin under a pressure of about 2 centimeters mercury and collecting the distillate.

22. The method of purifying rosin which includes distilling rosin in the presence of about 0.3-1.0% of a boron compound at a temperature of about 250-290° C. under pressure of about 1-2 centimeters of mercury.

In testimony of which invention, I have hereunto set my hand, at Kenvil, N. J., on this 12th day of December, 1929.

JOSEPH N. BORGLIN.

CERTIFICATE OF CORRECTION.

Patent No. 1,849,537.     Granted March 15, 1932, to

JOSEPH N. BORGLIN.

It is hereby certified that error appears in the printed specification of the above numbered patent requiring correction as follows: Page 2, line 102, claim 11, after the word "with" insert the word rosin and a comma; and that the said Letters Patent should be read with this correction therein that the same may conform to the record of the case in the Patent Office.

Signed and sealed this 3rd day of May, A. D. 1932.

(Seal)

M. J. Moore,
Acting Commissioner of Patents.

CERTIFICATE OF CORRECTION.

Patent No. 1,849,537.                          Granted March 15, 1932, to

JOSEPH N. BORGLIN.

It is hereby certified that error appears in the printed specification of the above numbered patent requiring correction as follows: Page 2, line 102, claim 11, after the word "with" insert the word rosin and a comma; and that the said Letters Patent should be read with this correction therein that the same may conform to the record of the case in the Patent Office.

Signed and sealed this 3rd day of May, A. D. 1932.

(Seal)                                                                  M. J. Moore,
                                                                        Acting Commissioner of Patents.